United States Patent
Karkkainen et al.

(10) Patent No.: US 9,509,991 B2
(45) Date of Patent: Nov. 29, 2016

(54) PROCESSING AND REPRODUCTION OF FRAMES

(71) Applicant: GURULOGIC MICROSYSTEMS OY, Turku (FI)

(72) Inventors: Tuomas Karkkainen, Turku (FI); Ossi Kalevo, Toijala (FI)

(73) Assignee: GURULOGIC MICROSYSTEMS OY, Turku (FI)

(*) Notice: Subject to any disclaimer, the term of this patent is extended or adjusted under 35 U.S.C. 154(b) by 589 days.

(21) Appl. No.: 13/959,157

(22) Filed: Aug. 5, 2013

(65) Prior Publication Data

US 2013/0315307 A1 Nov. 28, 2013

Related U.S. Application Data

(63) Continuation-in-part of application No. 13/461,029, filed on May 1, 2012, now Pat. No. 9,232,228, and a continuation-in-part of application No. 13/430,821, filed on Mar. 27, 2012, now Pat. No. 9,225,989, said
(Continued)

(30) Foreign Application Priority Data

Aug. 12, 2004 (FI) ........................... 20045290
Jun. 17, 2013 (EP) ........................... 13172237

(51) Int. Cl.
*H04N 5/14* (2006.01)
*H04N 19/50* (2014.01)
(Continued)

(52) U.S. Cl.
CPC ...... *H04N 19/00569* (2013.01); *H04N 19/507* (2014.11); *H04N 19/85* (2014.11)

(58) Field of Classification Search
CPC ................. H04N 19/00569; H04N 19/507; H04N 19/85
See application file for complete search history.

(56) References Cited

U.S. PATENT DOCUMENTS 4,553,171 A 11/1985 Holladay et al.
4,717,957 A 1/1988 Santamäki et al.
(Continued)

FOREIGN PATENT DOCUMENTS

EP 0 518 464 A2 12/1992
EP 0 551 990 A1 7/1993
(Continued)

OTHER PUBLICATIONS

International Preliminary Report on Patentability issued in PCT Appl. No. PCT/FI2014/050479; date of completion Sep. 9, 2015 (13 pages).
(Continued)

*Primary Examiner* — Nhon Diep
(74) *Attorney, Agent, or Firm* — Robert P. Michal, Esq.; Carter, DeLuca, Farrell & Schmidt, LLP (57) ABSTRACT

A processor is configured to receive input data, divide an individual frame into blocks, compare the blocks with corresponding blocks of a first prediction frame for and identify changed blocks. In order to obtain an efficient solution for processing and reproducing frames, the processor is configured to include in generated intermediate data the blocks identified as changed blocks, and generate a change indicator indicating the positions in the individual frame of the identified changed blocks and identified unchanged blocks.

15 Claims, 5 Drawing Sheets

Related U.S. Application Data application No. 13/461,029 is a continuation-in-part of application No. 13/430,821, which is a continuation of application No. 11/660,037, filed as application No. PCT/FI2005/050289 on Aug. 9, 2005, now Pat. No. 8,169,547.

(51) Int. Cl.
*H04N 19/507* (2014.01)
*H04N 19/85* (2014.01)

(56) References Cited

U.S. PATENT DOCUMENTS

| | | | |
|---|---|---|---|
| 5,377,018 A | 12/1994 | Rafferty | |
| 5,983,251 A | 11/1999 | Martens et al. | |
| 6,049,629 A | 4/2000 | Hirabayashi | |
| 6,160,848 A | 12/2000 | Sivan | |
| 6,275,527 B1 | 8/2001 | Bist et al. | |
| 6,373,890 B1 | 4/2002 | Freeman | |
| 7,865,015 B2 | 1/2011 | Chen et al. | |
| 9,225,989 B2 * | 12/2015 | Karkkainen | H04N 19/176 |
| 9,247,259 B2 * | 1/2016 | Rozen | H04N 19/176 |
| 2002/0048398 A1 | 4/2002 | Bokhour | |
| 2003/0091238 A1 | 5/2003 | Plaza | |
| 2003/0165273 A1 | 9/2003 | Berkner et al. | |
| 2005/0013466 A1 | 1/2005 | Beun | |
| 2006/0013495 A1 | 1/2006 | Duan et al. | |
| 2006/0215943 A1 | 9/2006 | Agari et al. | |
| 2007/0195993 A1 | 8/2007 | Chen et al. | |
| 2010/0231599 A1 | 9/2010 | Tung et al. | |
| 2012/0219065 A1 | 8/2012 | Karkkainen et al. | |
| 2013/0022111 A1 | 1/2013 | Chen et al. | |
| 2013/0235932 A1 * | 9/2013 | Srinivasan | H04N 19/00733 375/240.12 |
| 2013/0315307 A1 * | 11/2013 | Karkkainen | H04N 19/507 375/240.12 |

FOREIGN PATENT DOCUMENTS

| | | |
|---|---|---|
| EP | 0 5888 653 | 3/1994 |
| EP | 05886530 A2 | 3/1994 |
| EP | 0899959 A2 | 3/1999 |
| WO | WO 86/03922 A1 | 7/1986 |
| WO | WO 01/57803 A1 | 8/2001 |
| WO | WO 2006/016007 A1 | 2/2006 |

OTHER PUBLICATIONS

European Examination Report, Application No. 13 172 237.3 dated May 15, 2015, 7 pages.
Written Opinion of the International Preliminary Examination Authority, International Application No. PCT/FI2014/050479 dated Jun. 24, 2015, 10 pages.
A Communication (Extended European Search Report) dated Aug. 6, 2013, which was issued from the European Patent Office in a related European Application No. 13172237.3 (11 pages).
Office Action issued in U.S. Appl. No. 13/430,821 dated Aug. 12, 2015 (7 pages).
Office Action issued in U.S. Appl. No. 13/461,029 dated Aug. 11, 2015 (7 pages).
The PCT International Search Report mailed Sep. 5, 2014, issued by the International Search Authority in Finland (ISA/FI) in a related PCT International Patent Application No. PCT/FI2014/050479 (6 pages).
The PCT Written Opinion mailed Sep. 5, 2014, issued by the International Search Authority in Finland (ISA/FI) in a related PCT International Patent Application No. PCT/FI2014/050479 (10 pages).
Hein, David, et al., "Video Compression Using Conditional Replenishment and Motion Prediction," IEEE Transactions on Electromagnetic Compatibility; IEEE Service Center, New York, NY, vol. EMC-10, No. 3, Aug. 1, 1984, pp. 134-142, XP011165174.
Sivan, Zohar, et al., "Change Detector for Image Sequence Coding," Proceedings of the Picture Coding Symposium (PCS), Lausanne, Mar. 17-19, 1993, pp. 14,1A-14.1/B, XP000346481.
Zhao Y. et al., "Macroblock skip-mode prediction for complexity control of video encoders," International Conference on Visual Information Engineering, Jul. 7, 2003, pp. 5-8, XP002542234.
http://www.newmediarepublic.com/dvideo/compression/adv07. html, publ. Feb. 14, 2004 (Wayback archive), chapter, "Block Based Difference Coding".
A Communication (Extended European Search Report) dated Nov. 29, 2012 issued from the European Patent Office in related European Application No. 12 17:3 534.4 (4 pages).
Communication (Communication pursuant to Article 94(3) EPC dated Jun. 17, 2013 issued from the European Patent Office in related European Application No. 12 173 534.4 (4 pages).
European Patent Office communication entitled Summons to Attend Oral Proceedings Pursuant to Rule 115(1) EPC issued Jan. 19, 2016 in corresponding European Patent Application No. 13172237.3, 7 pages.
English translation of the Decision to Refuse a European Patent Application issued by the European Patent Office in relation to European Patent Application No. 13 172 237.3-1908 dated Aug. 4, 2016 (14 pages).

\* cited by examiner

PROCESSING AND REPRODUCTION OF FRAMES

CROSS-REFERENCE TO RELATED APPLICATIONS

This is a continuation-in-part of U.S. application Ser. No. 13/461,029 filed May 1, 2013, which in turn is a continuation of U.S. application Ser. No. 13/430,821 filed Mar. 27, 2012, which in turn is a continuation-in-part of U.S. application Ser. No. 11/660,037 filed Feb. 12, 2007 (now U.S. Pat. No. 8,169,547 issued May 1, 2012), which is a National Stage Entry of PCT International Application PCT/FI05/050289 filed Aug. 9, 2005, which in turn claims priority from Finnish Application No. 20045290 filed Aug. 12, 2004 (now Finnish Patent No FI 117845). The present application is also a continuation-in-part of U.S. application Ser. No. 13/430,821 filed Mar. 27, 2012, which in turn is a continuation of U.S. application Ser. No. 11/660,037 filed Feb. 12, 2007 (now U.S. Pat. No. 8,169,547 issued May 1, 2012), which in turn claims priority from PCT International Application PCT/FI05/050289 filed Aug. 9, 2005, which in turn claims priority from Finnish Application No. 20045290 filed Aug. 12, 2004 (now Finnish Patent No. FI 117845). The present application also claims priority from European Patent Application No. EP 13172237.3 filed Jun. 17, 2013. The entire disclosure of each of which is incorporated hereby by reference.

TECHNICAL FIELD

This application relates to a solution for optimizing storage and transfer of data by processing the data and by subsequently reproducing the processed data. In the following the examples will be presented mainly by referring to video data and audio data. It should be observed that these are only examples and that also other kind of data can be utilized, such as images, graphics data, text data, ECG data, seismic data, ASCII data, Unicode data, binary data.

BACKGROUND INFORMATION

Previously there is known from WO 2006/016007 A1 a solution where individual frames of input data are divided into blocks, and each such block is compared to a corresponding block of a prediction frame in order to identify changed blocks and unchanged blocks. The blocks identified as unchanged are modified by setting the colour values of the pixels of these blocks to a predetermined value, and a signal is generated to contain all the blocks including the changed blocks and the unchanged blocks. The colour value of the unchanged movement blocks has been selected such that a codec encoding the generated signal works as efficiently as possible.

Once the original frames need to be regenerated, the encoded signal is decoded, and a prediction frame is modified for each subsequent frame such that only the changed blocks of the decoded signal are used for modifying the prediction frame, while the unchanged blocks of the decoded signal whose pixel values correspond to the predetermined colour value are not used for modifying the prediction frame.

The above described prior art solution works efficiently for video images. However, it would be desirable to still reduce the amount of data that needs to be transmitted or stored between the processing of the original frames and the regeneration of the original frames.

SUMMARY

An object is to solve the above mentioned drawback and to provide a solution which can be utilized also for other purposes than for video images, and which makes it possible to transfer or store data more efficiently than previously. This and other objects are obtained with the solution according to independent claims.

The use of a change indicator that indicates the positions in the individual frame of the changed blocks and unchanged blocks makes it possible to drop blocks identified as unchanged. Therefore the data which is stored or transmitted for subsequent use by a reproducer can be minimized. The reproducer is capable of generating output data based on the intermediate data and the change indicator such that the output data corresponds to the original input data with a sufficient accuracy.

BRIEF DESCRIPTION OF DRAWINGS

In the following examples will be presented with reference to the attached drawings, in which.

DETAILED DESCRIPTION

Figure 1:
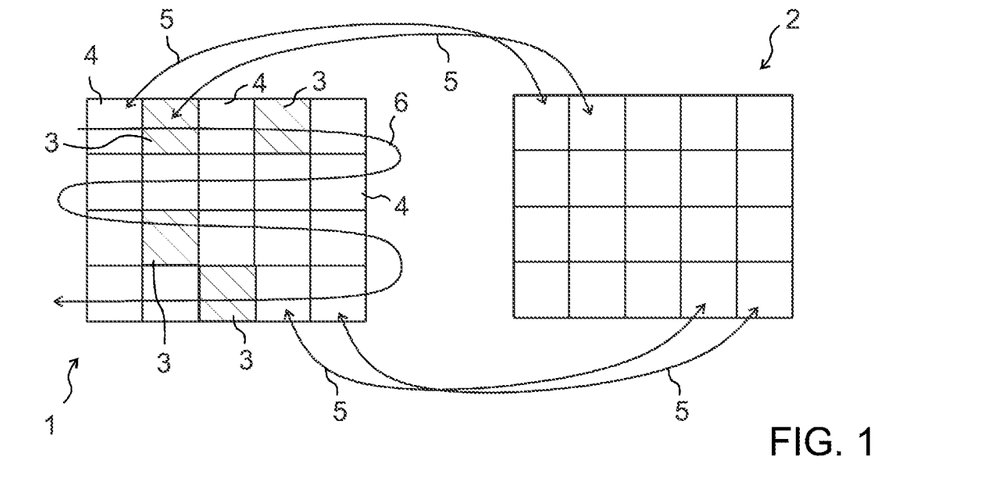
FIGS. 1 to 3 illustrate processing of input data.
Figure 2:
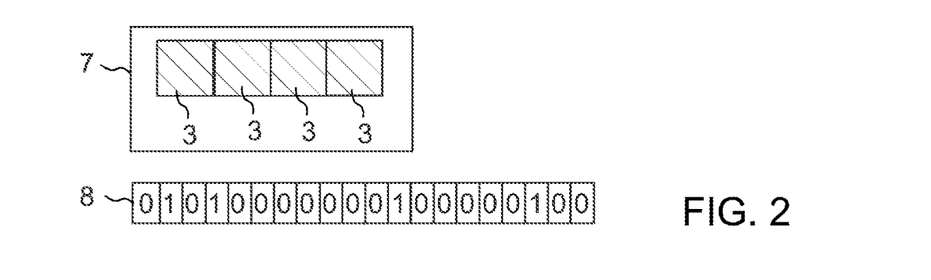
Figure 3:
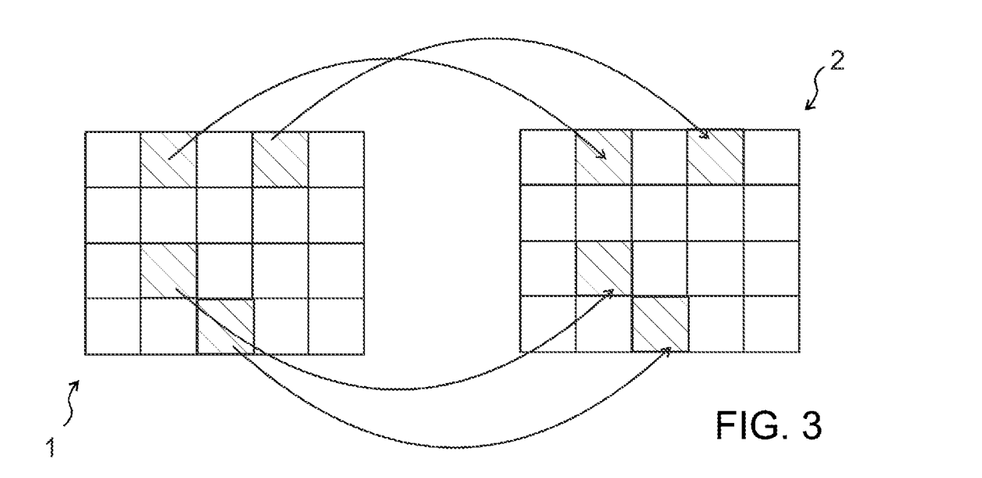

FIGS. 1 to 3 illustrate processing of input data. FIG. 1 illustrates an individual frame 1 included in the received input data. The input data may originally be included in packets, for instance. The individual frame 1 is divided into data blocks of a suitable size. The block may include data in one dimension, two dimensions or more than two dimensions. In case of an image of a video, each block may include 8×8 pixels, for instance, in the example of FIG. 1 the individual frame 1 has been divided into 20 blocks. The input data may include video data, audio data, images, graphics data, text data, ECG data, seismic data, ASCII data, Unicode data, binary data or financial data, for instance.

The blocks of the individual frame 1 which is being processed are compared to corresponding blocks of a first prediction frame 2, as illustrated by arrows 5. In praxis, the first prediction frame 2 represents the content of the previously processed individual frame. In case of a video, the prediction frame 2 may represent the previous image in the video (or an entirely black or other predefined or delivered color valued frame) when a first individual frame or alternatively an Intra frame or key frame of input data is being processed and the comparison will indicate what parts (blocks) of the individual frame 1 have changed since the previous image in the video, for instance. Previously there are known many alternative ways of carrying out such comparison. The comparison may be based on colour values, luminance, or intensity, for instance. It is also previously known to utilize thresholds in determining whether or not a block is identified as changed, such that a change in one single pixel is not necessarily determined to be an indication of a changed frame, but instead a sufficient number of pixels must have changed, for instance, in order to determine that the threshold is passed and the block is identified as changed. Such a threshold may be utilized in some implementations, in order to ensure that only detected differences which are significant enough trigger detection of a changed block. It is also possible to use RD-optimization (Rate-Distortion Optimization) to make the decision as to whether the block is unchanged or changed. The calculated RD-value of the unchanged block is then compared with the RD-value calculated by using some coding method for coding the block. The RD-value depends on the target quality of the reconstruction and it can be calculated from equation:

RD-value=reconstruction error+lambda*bits, where lambda is quality target multiplier. Small lambda value (e.g. 0 to 5) means that the quality target is high and big lambda value (e.g. 100 to 1000) means that the quality target is low. Reconstruction error can be e.g. sum of absolute differences (SAD), sum of square differences (SSD), mean absolute error (MAE), mean square error (MSE), maximum absolute difference (MaxAD), but not limited thereto.

The comparison is carried out by comparing each block of the individual frame 1 with the corresponding block in the prediction frame 2. The blocks of the individual frame 1 may be processed in the order illustrated by arrow 6, for instance. During the processing intermediate data 7 and a change indicator 8 illustrated in FIG. 2 are generated.

In the illustrated example it is by way of example assumed that the block in the upper left corner of the individual frame 1 does correspond to the block in the upper left corner of the prediction frame 2, therefore this block is identified as unchanged. This unchanged block 4 is dropped by not including it into the intermediate data 7. The change indicator 8 is, however, generated to indicate the first processed block of frame 1 as unchanged with a "0" (most to the left in FIG. 2).

The second block from left in the upper row of the frame 1, however, is assumed to not correspond to the second block from left in the upper row of the prediction frame 2. Therefore this block is identified as a changed block. The changed block 3 is included in the intermediate data 7 and the change indicator 8 is generated to indicate the second processed block of frame 1 as changed with a "1".

The processing continues for all blocks of frame 1 as explained above, resulting in the intermediate data 7 and change indicator 8 illustrated in FIG. 2 for the first processed individual frame 1 illustrated in FIG. 1. As can be seen in FIG. 2, the intermediate data 7 includes for the first processed individual frame 1 only the image data of four changed blocks 3, and the change indicator 8 for this processed frame 1 indicates in the order that the frame has been processed with a "1" locations of changed blocks 3 and with a "0" locations of (dropped) unchanged blocks 4. The intermediate data 7 and the change indicator 8 for the first block is stored or forwarded for further processing.

Once the first block of the input data has been processed, the prediction frame 2 is modified, if necessary. The modification may be carried out such that the pixels of the blocks of the first processed individual frame 1 that have been identified as changed blocks 3 are copied into the corresponding locations of the first prediction frame 2, as illustrated in FIG. 3.

After this a new individual frame is received from the input data, and this new individual frame is processed in the same way as explained above for the first individual frame, however, by carrying out the comparison to the modified first prediction frame. This process results in additional intermediate data and an additional change indicator, which again are stored or forwarded for further transmission.

After processing of the second individual frame, the first prediction frame is again modified (if necessary), and the process continues until all individual frames of the received input data have been processed in the same way. Sometimes the video or scene will change dramatically between two video frames, or an intra frame or a key-frame is required for the frame. For that kind of purposes it is possible to deliver separate global change information (e.g. global motion information, scale, multiplier, or addition/subtraction value for reference frame) or indication that the reference frame is initialized (and optional initialization values) from the processor to the reproduction device, which uses it as the second prediction frame when intermediate data is processed by the reproducer. In this way the processor and the reproducer can operate similarly and guarantee successful operation (similar frames are used in prediction and reconstruction).

Figure 4:
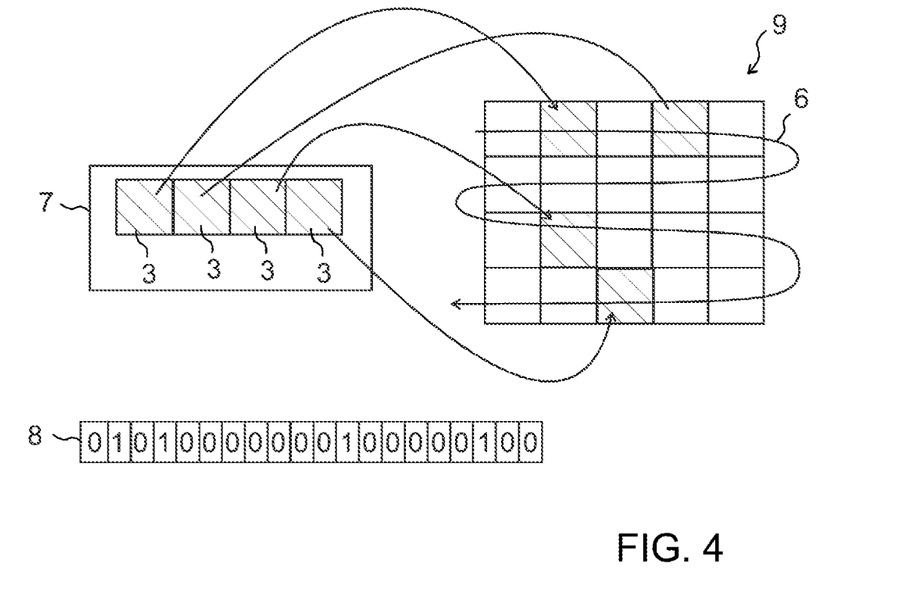
FIG. 4 illustrates reproduction.

FIG. 4 illustrates reproduction based on the intermediate data and the change indicator produced in the processing of FIGS. 1 to 3.

In FIG. 4 a second prediction frame 9 is modified by utilizing the intermediate data 7 containing the changed blocks 3 and the change indicator 8 produced during processing of the first individual frame 1 of the input data according to FIGS. 1 to 3. The blocks of the second prediction frame 9 are processed in the same order as in FIG. 1, as illustrated by arrow 6.

The changed blocks 3 included in the received intermediate data 7 are obtained one by one, and the received change indicator is used to determine at which positions the changed blocks 3 should be used for modifying the data of the second prediction frame 9. For instance, the first "0" in the change indicator indicates that the upper left block of the second prediction frame 9 should not be modified, while the second "1" indicates that the second block from the left upper corner of the prediction frame 9 should be modified by using the content of the first changed block 3 of the intermediate data.

Once the process has been repeated for the entire second prediction frame 9, output data is generated to include the content of the modified second prediction frame 9. At that stage processing of the intermediate data and the position indicator produced by processing of the second individual frame in FIGS. 1 to 3 is started. At this stage the second prediction frame 9 modified as explained above is used for further modification in the same way as explained above. Finally output data is again generated to include the content of the newly modified second prediction frame 9.

The result is that during reproduction output data is generated that corresponds to the original input data with a sufficient accuracy.

Figure 5:
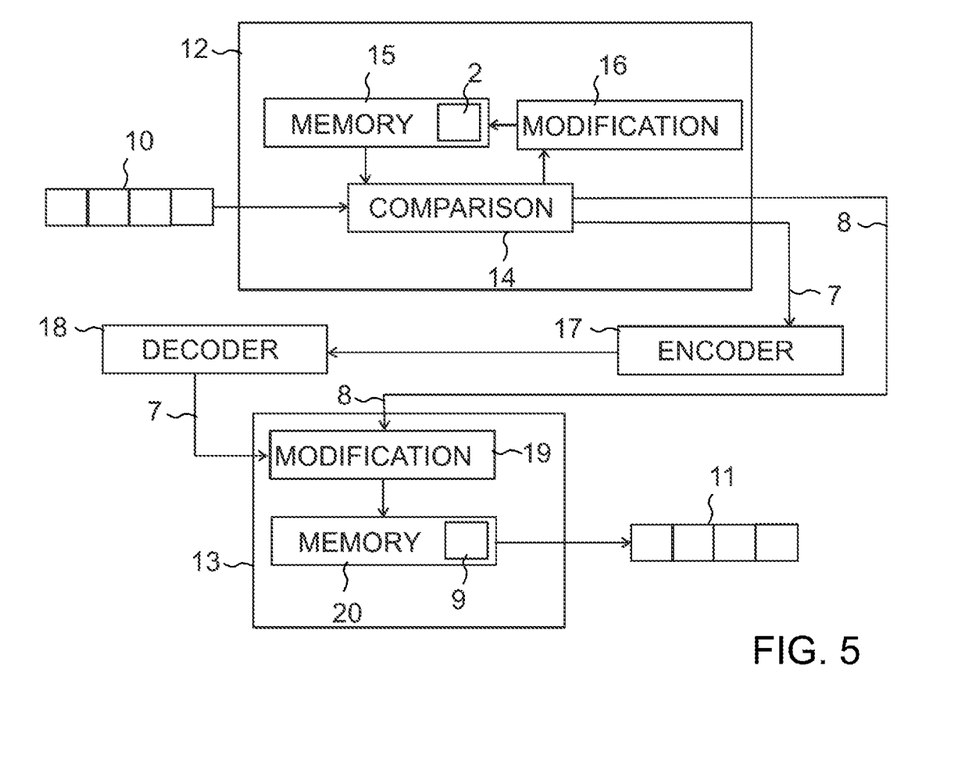
FIG. 5 illustrates a system with a processor and a reproducer.

FIG. 5 illustrates a system with a processor and a reproducer. The processor and the reproducer may be configured to operate as has been explained in connection with FIGS. 1 to 4.

FIG. 5 illustrates a processor 12 receiving input data 10 for processing, and a reproducer 13 which receives data from the processor 12, and which subsequently is capable of producing an output data 11 that with a sufficient accuracy corresponds to the input data 10.

The processor 12 and the reproducer 13 may be implemented with circuitry, a combination of circuitry and software or as computer programs which are configured to control a programmable computer to carry out the tasks of the previous and the following explanation. In case of computer programs, each computer program may be contained on a non-transitory computer storage medium which can be read by a computer.

The processor 12 comprises a comparator 14, which receives the input data 10, divides one frame at a time into data blocks and carries out the comparison between the blocks of the processed individual frame 1 and the first prediction frame 2 (maintained in the memory 15), as explained in connection with FIG. 1. Based on the comparison the blocks detected as changed blocks 3 are included in the generated intermediate data 7 and the positions of the changed blocks 3 and the unchanged blocks are included in the change indicator 8. After processing of each individual frame, the first prediction frame 2 maintained in memory 15 is modified (if necessary) by a modification block 16, if necessary, as explained in connection with FIG. 3.

The intermediate data 7 is forwarded to an encoder 17, directly or after storage in a memory (not illustrated). The encoder may be standard previously known image/video encoder, such as a DiVX, MPEG4, JPEG or JPE2000 encoder, for instance. Such an encoder 17 is capable of reducing the data size of the intermediate data considerably, as previously known. However, the fact that the unchanged blocks have already previously been dropped by the processor, makes the encoding much more efficient as it is not necessary for the encoder 17 to process all the blocks of the original input data 10, but only the changed blocks 3. Additionally, the amount of data which is transmitted (possibly stored in a memory before being transmitted) for subsequent use by a reproducer can be minimized.

In order to reproduce the original data, such as a video, the encoded intermediate data is forwarded to a decoder 18, directly or after storage in a memory (not illustrated). Also the decoder 18 may be a standard previously known image/video decoder, for instance. The decoder restores the intermediate data 7 which is forwarded to the reproducer 13, directly or after storage in a memory (not illustrated).

A modification block 19 utilizes the intermediate data 7 and the change indicator 8 to modify the second prediction frame 9 maintained in a memory 20, as explained in connection with FIG. 4. Output data 11 is produced by the reproducer by including the content of the second intermediate frame 9 into the output data 11. Consequently the output data 11 corresponds with sufficient accuracy to the input data 10, and the original video (for instance) may be displayed on a display, for instance.

In FIG. 5 it is by way of example assumed that the encoder 17 and the decoder 18 are standard previously known encoders and decoders. Therefore, as such encoders and decoders are not capable of handling the change indicator 8, the change indicator is in the example of FIG. 5 forwarded directly from the processor 12 to the reproducer 13, directly or after storage in a memory (not illustrated). However, in case a modified non-standard encoder or decoder is utilized such that the encoder, decoder or both are capable of receiving and handling the change indicator 8, then also the change indicator may be forwarded via the encoder and/or decoder. When the encoder and the decoder are capable of handling change indicators, then it is also possible that the size of the delivered frame to the encoder is similar than the size of the input frame, but in the encoder and in the decoder the data values of the blocks that are unchanged by change indicator are just ignored in the processing (encoding and decoding) and the data values of those blocks will be similar than the data values of the prediction frame. This enables minimizing the amount of processing, as well as the data delivery, in the encoder and in the decoder but the changed blocks can still be coded e.g. with motion estimation methods. This is possible due to the block positions being preserved and the prediction frame containing all the needed data values. Naturally, it is also possible that the encoder 17 is integrated into the processor 12, and/or that the decoder 18 is integrated into the reproducer 13.

Above in connection with FIGS. 1 to 5 the processing and reproduction has been explained mainly by referring to a video and images of a video. However, the input data may in praxis be some other type of data than video. One alternative is that the input data is audio data, in which case the frames contain samples of audio signals, for instance. One frame may contain 200 samples, for instance. In that case the comparison may be carried out by comparing the frequency and/or the intensity of the samples, for instance, in order to identify the changed blocks and the unchanged blocks of the processed individual frame. In that case also an encoder and decoder suitable for handling audio signals may be utilized.

One alternative for still image encoding is that e.g. each row (or column) of data blocks is processed as one frame. This enables that still image contains also multiple frames and this kind of method enables prediction to utilize spatial information instead of the temporal information that is used in video frames, where the individual images are frames.

Figure 6:
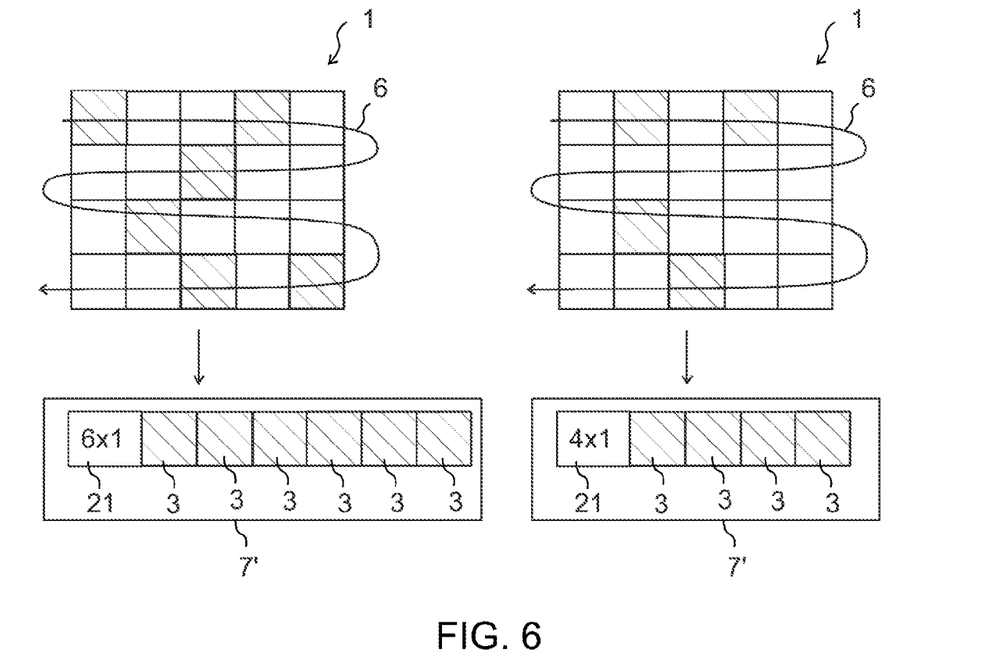
FIG. 6 illustrates a second embodiment for processing input data.

FIG. 6 illustrates a second embodiment for processing input data. The second embodiment corresponds to a great extent to the embodiment explained in connection with FIGS. 1 to 5. Therefore the embodiment of FIG. 6 will be explained mainly by pointing out the differences between these embodiments.

Some standard image/video encoders require information about the frame size of the image that needs to be encoded. Therefore in the embodiment of FIG. 6 the intermediate data 7' produced during processing of the first individual frame 1 (to the right in FIG. 6) and the following individual frame 1 (to the left in FIG. 6) includes a header 21 indicating the frame size. In the illustrated example the headers 21 are shown to indicate the frame size in the form 4×1 and 6×1, where the numbers refer to the number of blocks (such as blocks with 8×8 pixels) included in the frame in the horizontal and vertical direction. This is, however, only an example. In practice it is not important what size or form the frame has (2×2 or 1×4 instead of 4×1; 1×6 or 3×2 or 2×3 instead of 6×1) as long as the number of blocks that needs to be encoded for each frame is clear for the encoder. If the block size is not predetermined (such as 8×8 pixels), the frame size indicator may include information about the size of the blocks in addition to the number of blocks in the horizontal and vertical direction. Alternatively, the frame size may be indicated directly and only as the number of pixels in the horizontal and vertical direction of the entire frame, such as M×N pixels, for instance, in which case the number of blocks must not necessarily be indicated at all.

Figure 7:
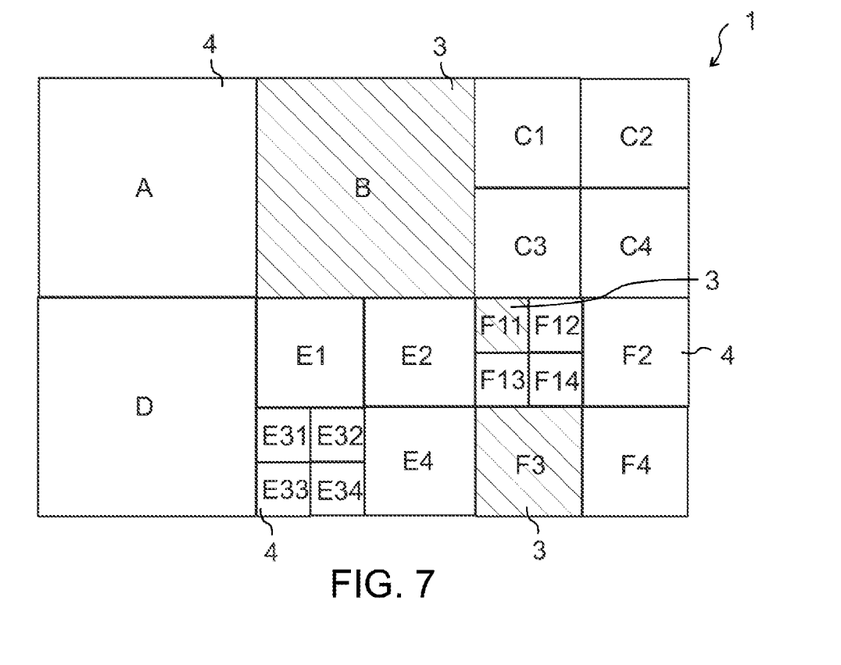
FIG. 7 illustrates a third embodiment for processing input data.

FIG. 7 illustrates a second embodiment for processing input data. The second embodiment corresponds to a great extend to the embodiments explained in connection with FIGS. 1 to 6. Therefore the embodiment of FIG. 7 will mainly be explained by pointing out the differences between these embodiments.

In FIG. 7 the individual frame 1 included in the input data is divided into blocks of different size. Therefore, in order to be able to correctly reproduce, the change indicator additionally indicates the size of the blocks of the processed individual frame.

In the illustrated example, the individual frame 1 is at a first level divided into six blocks A, B, C, D, E, F with the same predefined size. However, each one of the six blocks may be split into four sub blocks, and each sub block may again be split into four sub blocks.

In order to correctly carry out the comparison of the individual frame 1 divided into blocks as illustrated in FIG. 7, the first prediction frame is divided into blocks in the same way. Thereby blocks of equal size may be compared to each other.

The size indicator may include for each block a first indicator which is "0" if the block is not split into four sub blocks, and which is "1" if the block is split. In case the block is split into four sub blocks, four indicators follow that indicate whether or not the sub blocks are split in to four new sub blocks. In case of the illustrated example, the size indicator takes the form: 0 0 1 0000 0 1 0010 0000 1 1000 0000, where first two "0" illustrate that the initial blocks A and B are not split, third block C is split "1" but the four sub blocks are not split "0000", fourth block D is not split "0", fifth block E is split "1" in to four sub blocks, first two sub blocks (E1, E2) are not split but sub block E3 is split into four sub blocks and sub block E4 is not spot "0010", etc.

When the size indicator as explained above is included in the change indicator 8 and forwarded from the processor 12 to the reproducer 13 together with the intermediate data 7 containing the changed blocks (irrespective of their size), the reproducer 13 is capable of reproducing a frame corresponding with sufficient accuracy to the individual frame 1 illustrated in FIG. 7 such that also the size of the blocks can be taken into account.

The embodiment of FIG. 7 may be used in combination with the embodiment of the previous embodiments, such that some of the frames of the input data are divided into blocks having a fixed standard size, and some of the blocks are divided into blocks of different size. In that case the size indicator needs to be included into the change indicator 8 only for the blocks which are not divided into the fixed standard size.

Naturally, the way of dividing the frames into blocks of different size explained in connection with FIG. 7 is only an example, and in practice the frames may be divided into blocks of different size in some other way, in which case the size indicator which is included in the change indicator 8 indicates the block size in a different way. One alternative is to utilize initial blocks of smaller size, which are combined into larger blocks when appropriate.

As an alternative to the previous examples, the processor and the reproducer can be used recursively. This means that the same frame of the input data can be processed with the processor multiple times and every time the frame is processed the quality of reconstructed image is increased. With recursive processing it is possible to deliver every round all the change indication values or it is possible that in the next round only those values are delivered that were changed in the previous indication values. Such a solution may be implemented such that in a first round a frame of the input data is processed with the processor, intermediate data and the change indicator is forwarded to the reproducer and the first prediction frame is updated. In a second round the same frame of the input data is again processed, but now by using the updated first prediction frame. Again intermediate data and the change indicator is forwarded to the reproducer and the first prediction frame is updated. After the second round the same frame of the input data may be processed again and even more than once, each time by utilizing the latest updated first prediction frame. Therefore the same frame of the input data is recursively processed in small steps until the first prediction frame is close enough to the processed frame of the input data. It is possible that in all rounds the changed/unchanged information is delivered for all blocks or then it is possible that the information is delivered in next round only for those blocks that were changed in the previous round.

Figure 8:
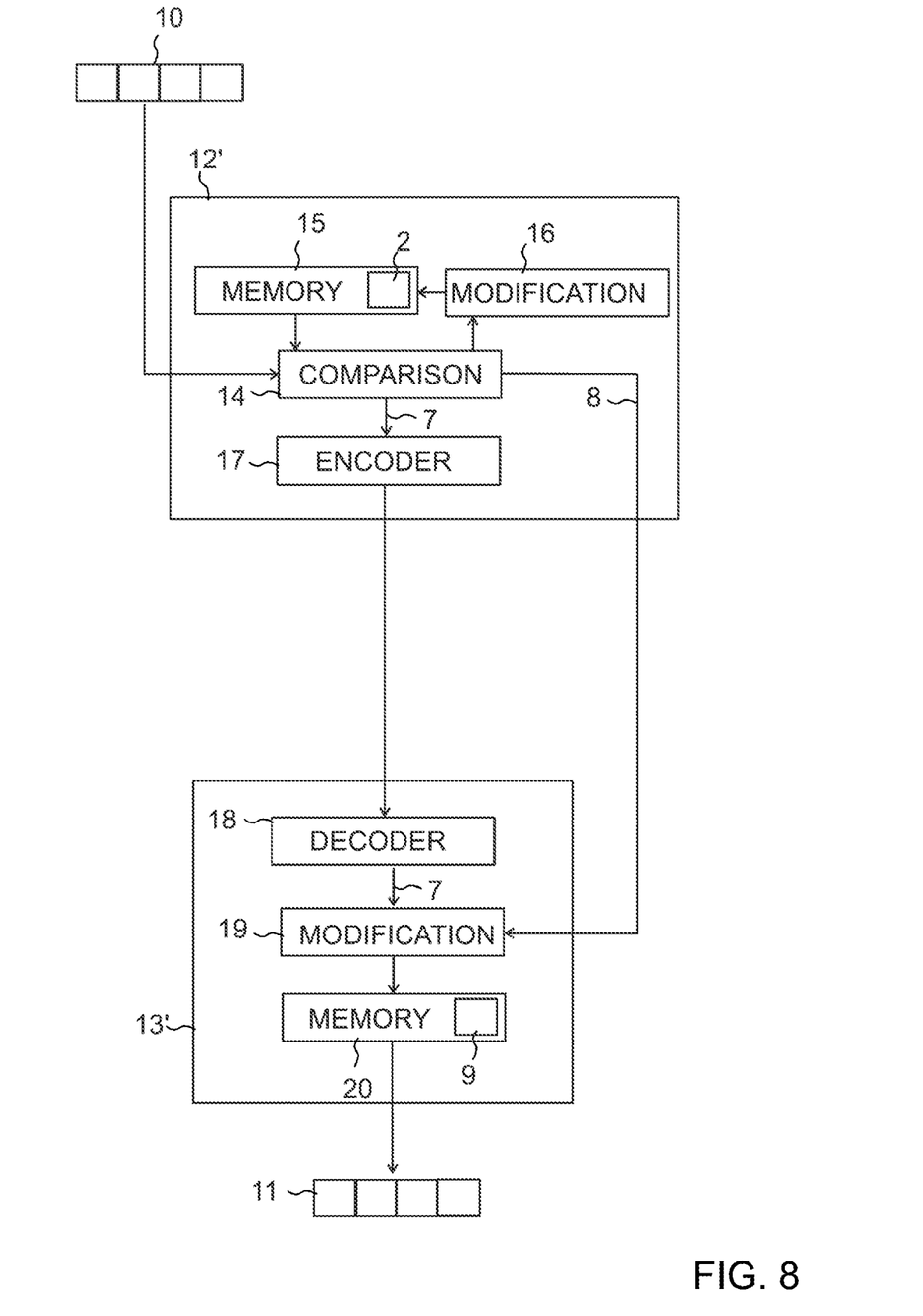
FIG. 8 illustrates a second embodiment of a system with a processor and a reproducer.

FIG. 8 illustrates a second embodiment of a system with a processor and a reproducer. The embodiment of FIG. 8 is very similar as the embodiment explained in connection with FIG. 5. Therefore the embodiment of FIG. 8 will be explained mainly by pointing out the differences between these embodiments.

In FIG. 8 a processor 12' with an integrated encoder 17 is utilized. Similarly, the reproducer 13 comprises an integrated decoder. Therefore only two components are needed for processing the input data 10 and for reproducing the output data 11.

Figure 9:
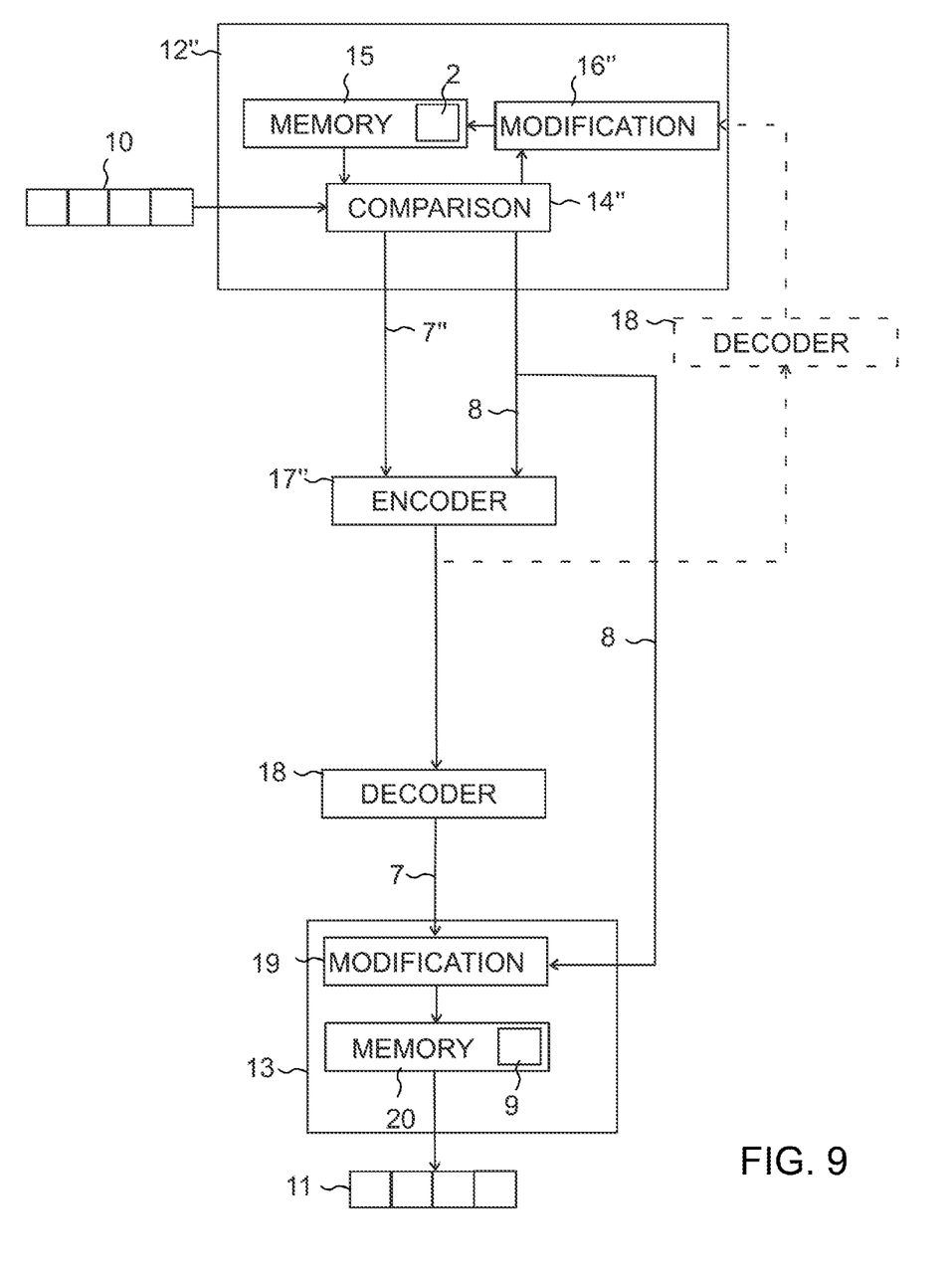
FIG. 9 illustrates a third embodiment of a system with a processor and a reproducer.

FIG. 9 illustrates a third embodiment of a system with a processor and a reproducer. The embodiment of FIG. 9 is very similar to the embodiment of FIG. 5. Therefore the embodiment of FIG. 9 will mainly be explained by pointing out the differences between the embodiment of FIG. 5 and the embodiment of FIG. 9.

In FIG. 5 it is by way of example assumed that the encoder 17 is a standard previously known encoder. However, in FIG. 9 the encoder 17" is not a standard encoder, but instead it is capable of receiving and handling the change indicator 8. Consequently, it is not necessary to drop the unchanged blocks 4 at the processor 12". Instead the intermediate data 7 may include both the changed blocks 3 and the unchanged blocks 4. Based on the change indicator 8 from the comparison block 14" of the processor 12" the encoder 17" is capable of selecting the correct blocks, in other words the changed blocks 3 only, for encoding. The encoding is carried out similarly as in the previous embodiments and the decoder 18 and the reproducer 13 therefore corresponds to the decoder and reproducer of the previous embodiment. Consequently dropping of unchanged blocks 4 is carried out by the encoder 17". The amount of data transmitted between the encoder 17" and the decoder 18 (directly or after storage in a memory) can therefore be minimized.

FIG. 9 also illustrates with dashed lines that the first prediction frame 2 is modified by taking into account encoding and decoding operations carried out for the changed movement blocks 3 contained in the intermediate data 7". In this way it can be ensured that possible modifications occurring due to the encoding and decoding operations can be accurately taken into account for the first prediction frame 2.

In FIG. 9 it is by way of example assumed that the encoder 17" is not included in the processor 12" (though it may be). The intermediate data 7" and the change indicator 8 is forwarded from the processor 12" to the encoder 17" directly or after storage in a memory (not illustrated). The signal obtained from the encoder is returned via an additional decoder 18 (may be integrated into the processor 12" or a separate element) to the modification block 16", which utilizes it when modifying the first prediction frame 2 that is maintained in the memory 15.

An advantage obtained by taking into account the encoding and decoding is that the first prediction frame 2 always corresponds as much as possible to the second prediction frame 9, which results in better quality. Additionally, in case the encoder 17" is integrated into the processor the encoder and the processor may utilize the same single first prediction frame in their operations.

It is to be understood that the above description and the accompanying figures are only intended to be examples. It will be obvious to a person skilled in the art that the variations and modifications can be made without departing from the scope of the claims.

The invention claimed is:

1. A processor configured to:
   receive input data,
   divide an individual frame included in the input data into blocks,
   compare the blocks of the individual frame with corresponding blocks of a first prediction frame for detecting differences in the compared blocks,
   identify as changed blocks the blocks of the individual frame for which differences have been detected,
   identify as unchanged blocks the blocks of the individual frame for which no differences have been detected, and
   generate intermediate data, wherein for at least one processed individual frame the processor is configured to:
   include in the intermediate data the blocks identified as changed blocks and a header indicating frame size associated with the generated intermediate data, and
   generate a change indicator indicating in the order that the individual frame is processed for each block with one single bit whether the block is a changed block or an unchanged block
   for at least one processed individual frame drop the blocks identified as unchanged blocks by not including them into the generated intermediate data,
   forward the intermediate data including the header to an encoder requiring information about the frame size, directly or after storage in a memory, and
   forward the change indicator to a reproducer directly or after storage in a memory.

2. The processor according to claim 1, wherein for each processed individual frame the processor is configured to include in the generated intermediate data also the blocks identified as unchanged blocks.

3. The processor according to claim 1, wherein for each processed individual frame the processor is configured to modify the first prediction frame such that when processing of a subsequent individual frame is carried out at least the blocks identified as changed blocks in the previous processed individual frame have been modified in the first prediction frame to correspond to the corresponding blocks of the previously processed individual frame.

4. The processor according to claim 1, wherein for each processed individual frame the processor is configured to modify the first prediction frame by utilizing a signal indicating the content of the changed blocks of the intermediate data after an encoding and decoding operation.

5. The processor according to claim 1, wherein the processor is configured to generate and include in the intermediate data a frame size indicator for the processed individual frame size of the changed blocks included in the intermediate data.

6. The processor according to claim 1, wherein the processor is configured to:
   divide the individual frame included in the input data into blocks of different size, and
   generate the change indicator to additionally indicate the size of the blocks of the processed individual frame.

7. The processor according to claim 1, wherein the processor is configured to compare the detected differences to a threshold, and to identify as changed blocks the blocks of the individual frame whose detected differences exceeds the threshold, and to identify as unchanged blocks the blocks of the individual frame whose detected differences do not exceed the threshold.

8. The processor according to claim 1, wherein the processor is configured to forward to a reproducer a global change information indication for use as a second prediction frame when intermediate data is processed by the reproducer.

9. A reproducer configured to:
   receive intermediate data with a header indicating frame size associated with the generated intermediate data, and
   modify a second prediction frame by utilizing the received intermediate data, and
   generate output data that includes the content of the modified second prediction frame, wherein the reproducer is configured to:
   obtain from the received intermediate data blocks identified as changed blocks,
   receive from a processor directly or after storage in a memory a change indicator indicating in the order that the second prediction frame is processed for each block with a single bit whether the block should be modified or should not be modified,
   receive said intermediate data including a header from a decoder directly or after storage in a memory, and;
   carry out said modifying by including the obtained changed blocks in the second prediction frame in the positions of the blocks that according to the change indicator should be modified.

10. A reproducer according to claim 9, wherein:
    the reproducer is configured to receive an indication of the size of the different blocks of the second prediction frame via the change indicator, and
    to carry out said modifying of the prediction frame (9) by taking into account the indicated size of the different blocks.

11. A reproducer according to claim 9, wherein the reproducer is configured to receive a global change information indication for use as the second prediction frame when intermediate data is processed by the reproducer.

12. A method of processing received input data, comprising:
    dividing an individual frame included in the input data into blocks,
    comparing the blocks of the individual frame with corresponding blocks of a first prediction frame for detecting differences in the compared blocks,
    identifying as changed blocks the blocks of the individual frame for which differences have been detected,
    identifying as unchanged blocks the blocks of the individual frame for which no differences have been detected, and
    generating intermediate data, wherein for at least one processed individual frame the method comprises:
    including in the generated intermediate data the blocks identified as changed blocks and a header indicating frame size associated with the generated intermediate data, and generating a change indicator indicating in the order that the individual frame is processed for each block with a single bit whether the block is a changed block or an unchanged block, dropping of the blocks identified as unchanged blocks by not including them into the generated data, forwarding the intermediate data including the header requiring information about the frame size to an encoder directly or after storage in a memory, and forwarding the change indicator to a reproducer directly or after storage in a memory.

13. A non-transitory computer readable medium storing a computer program executable by a processor, and comprising computer program instructions, which, when executed by the processor, cause the processor to perform the method according to claim 12.

14. A method of producing output data comprising:

receive intermediate data with a header indicating frame size associated with the intermediate data, and modifying a second prediction frame by utilizing the received intermediate data, and generating the output data to include the content of the modified second prediction frame, wherein the method comprises:

obtaining from the received intermediate data blocks identified as changed blocks, receiving from a processor directly or after storage in a memory a change indicator indicating in the order the second prediction frame is processed for each block with one single bit whether the block should be modified or should not be modified, receive said intermediate data including the header from a decoder directly or after storage in a memory, and carrying out said modifying by including the obtained changed blocks in the second prediction frame in the positions of the blocks that according to the change indicator should be modified.

15. A non-transitory computer readable medium storing a computer program executable by a processor, and comprising computer program instructions, which, when executed by the processor, cause the processor to perform the method according to claim 14.

* * * * *